J. KIEFER.
WAGON SEAT CLAMP.
APPLICATION FILED OCT. 7, 1912.
1,072,858.
Patented Sept. 9, 1913.
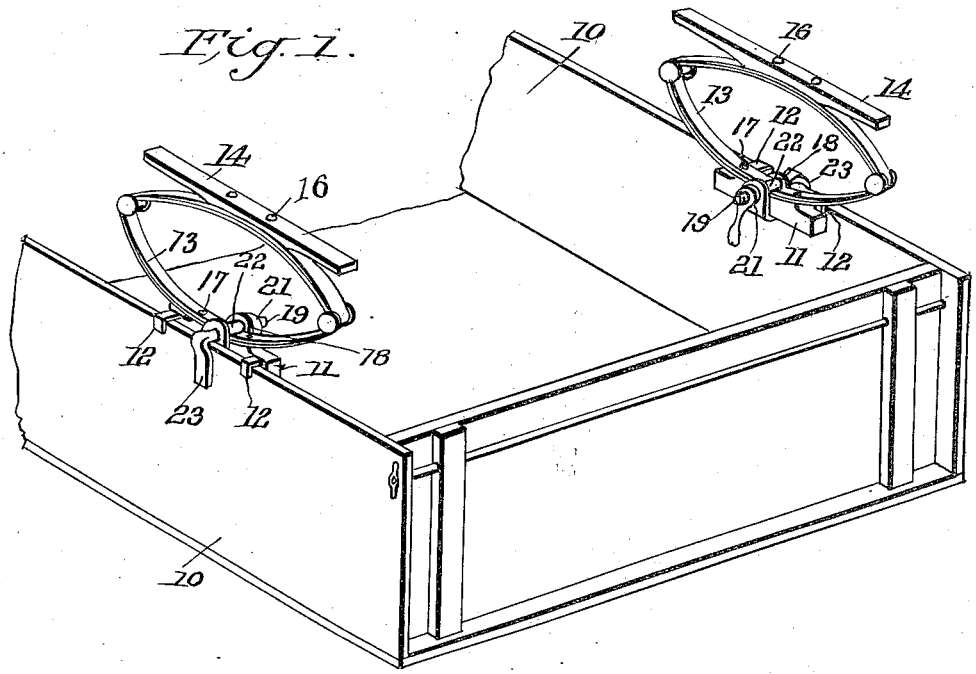
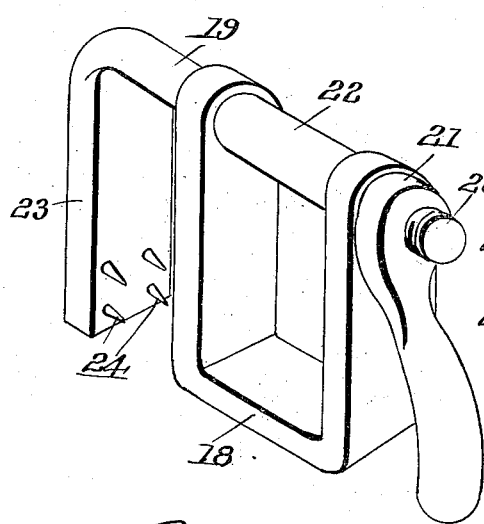
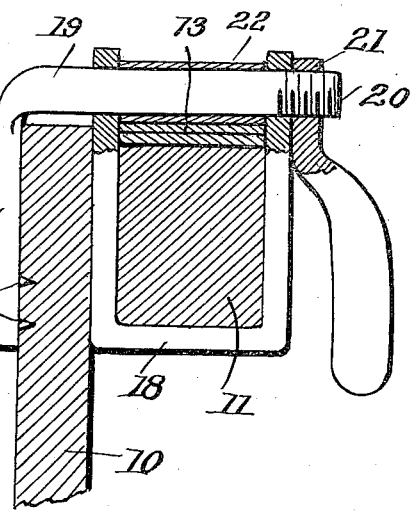
WITNESSES
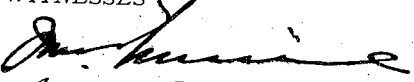
INVENTOR
John Kiefer
Attorneys

UNITED STATES PATENT OFFICE.

JOHN KIEFER, OF BOZEMAN, MONTANA.

WAGON-SEAT CLAMP.

1,072,858.

Specification of Letters Patent. Patented Sept. 9, 1913.

Application filed October 7, 1912. Serial No. 724,417.

*To all whom it may concern:*

Be it known that I, JOHN KIEFER, citizen of the United States, residing at Bozeman, in the county of Gallatin and State of Montana, have invented certain new and useful Improvements in Wagon-Seat Clamps, of which the following is a specification.

This invention relates to devices for securing seats to wagons, more particularly to the ordinary spring seats employed upon farm wagons, and has for one of its objects to provide a simply constructed attachment which may be applied without material structural change to the seat supports, and whereby the seats are locked to the body or box to prevent displacement under the severe jars and concussions to which the vehicle is subjected when traveling over rough roads.

Another object of the invention is to provide a simply constructed device which may be applied without material structural change to seat supports of various forms and sizes and likewise to wagon bodies of various forms and sizes.

With these and other objects in view the invention consists in certain novel features of construction which will be hereinafter shown and described and then specifically pointed out in the claims.

Figure 1 is a perspective view of a portion of a wagon body and the seat springs with the improvement applied. Fig. 2 is a detached perspective view enlarged of the improved device. Fig. 3 is an enlarged side elevation of the improved device with a portion of the vehicle body and one of the lower spring bolsters in transverse section and located therein.

Corresponding and like parts are referred to in the following description and indicated in all the views of the drawings by the same reference characters.

The improved device may be applied without material structural change to any of the various forms of spring seat supports, but for the purpose of illustration is shown applied to a conventional device of this character, but it will be understood that it is not desired to limit the invention to any specific form of seat support or to any specific form of wagon box or body.

A conventional wagon body is represented and includes side members 10 spaced apart. The seat support portion comprises a base member 11 having hooks or clips 12 to engage over the upper edge of the side members 10 of the body in the usual manner.

The seat springs are represented conventionally at 13 and provided with the seat supporting cleats 14 connected by bolts or other suitable fastening devices 16 to the springs, the springs being likewise secured by bolts or other suitable fastening devices to the base supports 11. The improved attachment comprises a U-shaped member 18 bearing around the support 11 and with a shaft 19 extending through its upper ends and above the member 11. The shaft 19 is threaded at one end as shown at 20 to receive the lever or handle nut 21 which operates externally of one of the sides of the member 18. Surrounding the shaft 19 between the sides of the member 18 is a tubular combined spacer and bearing member 22 which engages upon the upper edge of the member 11. The shaft 19 is extended beyond the adjacent side of the member 18 and down-turned, as shown at 23 and preferably provided with inwardly directed spurs 24. The suspending hooks or clips 12 are of sufficient size to permit one of the sides of the member 18 to extend between the member 11 and the adjacent side 10 of the body or box, while the down-turned portions 23 of the shafts 19 bear over the outer faces of the sides 10 of the body with the spurs engaging in the material of the body. By this arrangement it will be obvious that when the members 18 are positioned around the members 11 and strain applied by rotating the nut 21, the sides of the member 18 will be firmly clamped against the member 11 while the down-turned terminals 23 and the outer sides of the members 18 will likewise be firmly clamped upon the sides 10, and thus anchor the seat to the body and prevent its displacement so long as the strain is retained.

It will thus be obvious that a simply constructed device is produced which may be readily applied and by means of which the seat is firmly anchored to the body and all danger of accidental displacement prevented.

Having thus described my invention, what I claim is:

1. A wagon seat clamp comprising a clip device including compressible sides and adapted to receive a wagon seat support, a shaft extending through said compressible sides and with a down-turned terminal adapted to engage a wagon body, and means for applying strain longitudinally of said shaft.

2. A wagon seat clamp comprising a clip device including compressible sides and adapted to receive a wagon seat support, a shaft extending through said compressible sides and with a down-turned terminal adapted to engage a wagon body, a sleeve rotatable upon said shaft between the side members of the clip, and means for applying strain longitudinally of said shaft.

3. The combination with a wagon seat support including base members, means for supporting said base members upon a wagon body, a clamp device comprising a clip including spaced sides bearing against opposite sides of said base, a shaft extending through said sides and with a down-turned terminal adapted to engage a wagon body, and means for applying strain longitudinally of said shaft.

In testimony whereof I affix my signature in presence of two witnesses.

JOHN KIEFER. [L. S.]

Witnesses:
B. B. LAW,
NORA DISTAD.

Copies of this patent may be obtained for five cents each, by addressing the "Commissioner of Patents, Washington, D. C."